March 5, 1968 — J. S. SWICK — 3,371,464
SKIN PACKAGING APPARATUS
Filed Oct. 15, 1965 — 2 Sheets-Sheet 1
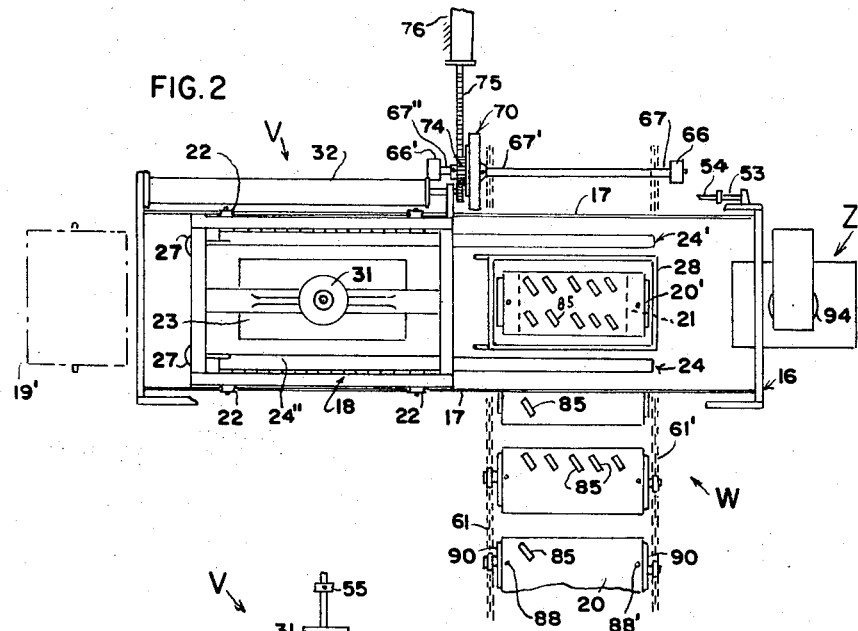
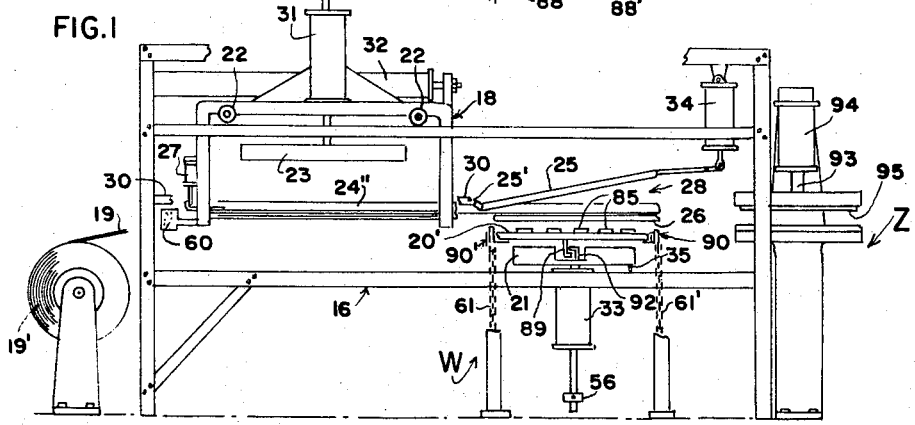
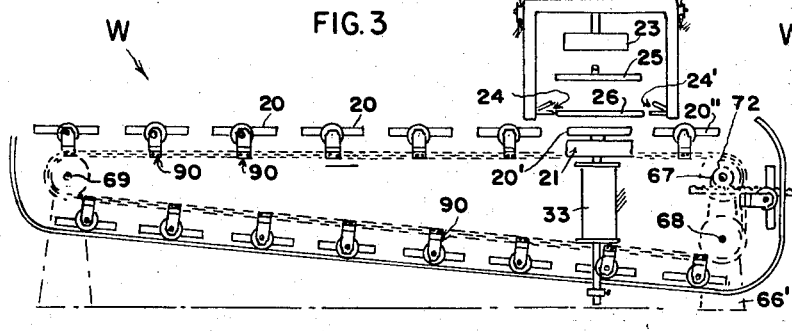
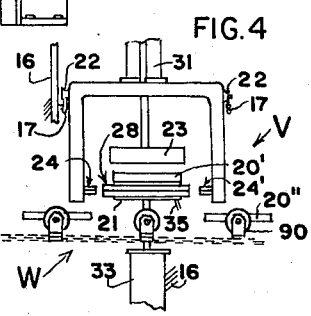
INVENTOR,
JOSEPH S. SWICK,
ATTORNEY.

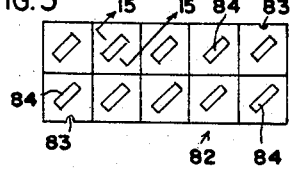
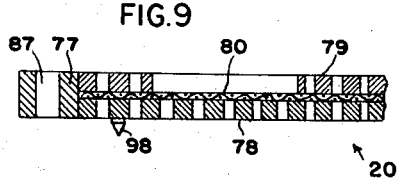
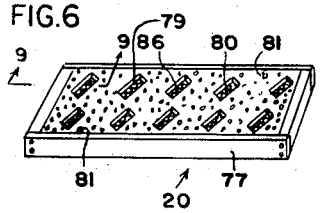
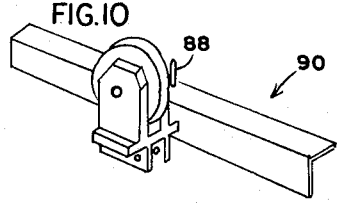
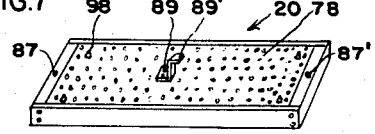
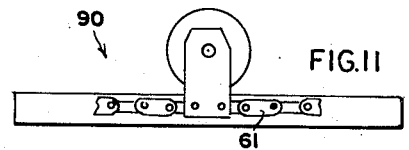
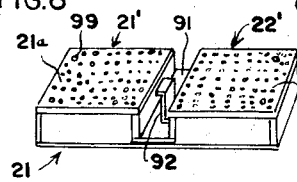
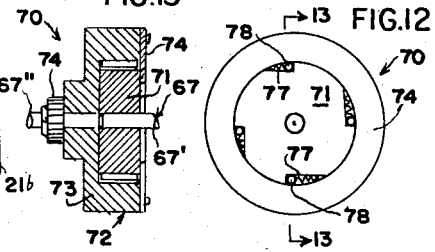
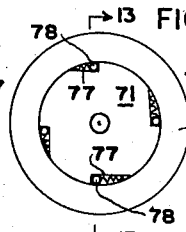
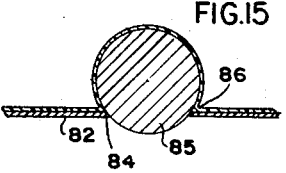
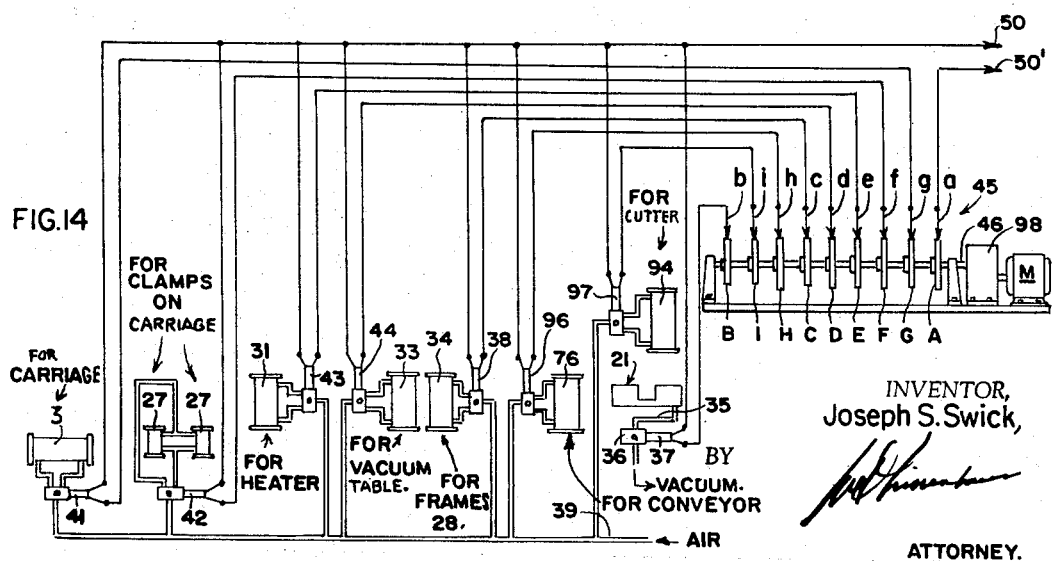

United States Patent Office 3,371,464
Patented Mar. 5, 1968

3,371,464
SKIN PACKAGING APPARATUS
Joseph S. Swick, 116 E. Mosholu Pkwy.,
Bronx, N.Y. 10471
Filed Oct. 15, 1965, Ser. No. 496,563
5 Claims. (Cl. 53—112)

The present invention relates to vacuum molding machines for working on thermoplastic sheet material to form relief shapes therein which conform to mold contours and more particularly to automatic skin-packing machinery functioning so that each package made consists of a card holding thereon an article within its margins with a thermoplastic cover sheet adhered to both said article and card whereby the said article serving as a mold, is encompassed by the central portion of the sheet as a "skin" covering thereon conforming to its surface contour.

The machine intermittently provides heated plastic sheeting over a work station where the laden card is met by a vacuum box which raises it into a frame holding the sheet material. Upon the application of vacuum action, the sheet is drawn downward. Thereafter, the vacuum box is lowered to its initial rest position and the work is moved away, allowing for the next packaging operation to take place.

The principal object of this invention is to provide means to successively convey the laden cards to the work station, allow them to cooperate with the vacuum box and then when the packing is completed, to be moved away while the next laden card is brought to the work station to be packaged.

Machines to feed and heat the plastic sheeting and to move and operate the vacuum box in proper timed relation may be of the type shown in my Patent No. 3,153,813 which is included herein to help illustrate how my present invention is used.

A further object of this invention is to provide laden card conveying means for an automatic vacuum molding machine of the character described, which is simple in construction, reasonable in cost, positive in action and efficient in carrying out the purposes for which it is designed.

Other objects and advantages will become apparent as this disclosure proceeds.

For one practice of this invention, the vacuum molding machine offers a roll of thermoplastic sheet material which is fed horizontally in a plane above the normal rest position of the vacuum box whose movement is upward to a work position and then downward when the work is done. I provide a conveyor to bring a laden card between the sheet material and the vacuum box every time the machine is cleared of finished work from the work station. This conveyor consists of opposite endless chains riding in vertical planes on suitably placed sprocket wheels. A series of equi-spaced releasable trays span said chains. Each tray is perforated and has locating means for a laden card thereon. Chain and vacuum box movements are in a proper timed relation. It is evident that the tray will rise with the vacuum box and a means is provided so that the tray will come down with the vacuum box and be restored to its engagement with the chains, before the conveyor is operated to bring the next laden tray to the work station. Although trays holding laden cards may be "fed" by an operator to the conveyor, I prefer that the trays remain on the chains and that the operator shall load the trays as they pass him at loading station, with laden cards. When the articles to be packaged are small, a card may carry a number of them in proper spaced relation and after the packaging is done at work station and the tray worked on removed therefrom, the card may enter a cutting apparatus and cut into uniform parts so that each part shall carry one article. I also prefer that the direction of movement of the trays towards the work station shall be along the horizontal and perpendicular to the line of movement of the plastic sheeting.

In the accompanying drawings forming part of this specification, similar characters of reference indicate corresponding parts in all the views.

FIG. 1 is a front elevation of an automatic skin packaging machine embodying the teachings of this invention. Some parts of the framework are shown broken away and other parts are omitted or are indicated diagrammatically in order to attain clarity of illustration. The conveyor apparatus is fragmentarily shown.

FIG. 2 is a top plan view of FIG. 1, here too, parts are omitted or broken away so that pertinent parts can best be seen.

FIG. 3 is a side view of FIG. 1, likewise abbreviated. In this view, the vacuum box is shown at its lowered position.

FIG. 4 is a fragmentary side view of FIG. 1, showing the vacuum box in raised position, holding a tray from off the conveyor, at work position, for action by the vacuum molding apparatus.

FIG. 5 shows the top face of a card on which the goods shall be skin packaged.

FIG. 6 is a perspective view showing a work-holding tray.

FIG. 7 is a bottom view of FIG. 6.

FIG. 8 is a perspective view of the vacuum box.

FIG. 9 is a fragmentary enlarged section taken at line 9—9 in FIG. 6.

FIG. 10 is an enlarged perspective view of a support for a tray end on a conveyor chain.

FIG. 11 shows the end view of a tray on the support shown in FIG. 10; said support being carried on a chain of the conveyor.

FIG. 12 is a diagrammatic face view of a one-direction clutch.

FIG. 13 is a section taken at line 13—13 in FIG. 12.

FIG. 14 is a diagrammatic representation of a control system which may be used for the machine here shown. It includes the electrical wiring circuits for the solenoids operating the valves associated with the several cylinders and the vacuum supply at molding station respectively and the piping system to feed compressed air to operate the cylinders. Also included, is one form of timing device to accomplish operation of the several components of the system in proper timed relation.

FIG. 15 is an enlarged section taken at line 15—15 in FIG. 5, including the skin-packaged item of merchandise.

In the drawings, the packaging machine illustrated in FIGS. 1–4, consists of a conveyor apparatus designated generally by the letter W, a vacuum molding apparatus denoted generally by the letter V and a card-cutting apparatus indicated generally by the letter Z. Said vacuum molding apparatus is essentially the one shown in my aforesaid patent, with some changes therein, which will be indicated.

The apparatus V consists of stationary framework indicated generally by the numeral 16 which includes the horizontal tracks or rails 17 to support the carriage 18. Carriage movement is from the position shown where it is intermediate a rotatably supported roll 19' of thermoplastic webbing 19 and a vacuum box denoted generally as 21 at molding station, to a position where such carriage on its rollers 22, is over said vacuum box and then of course back again and repeated. Said carriage has a horizontal electrically-operated heater 23 thereon, presenting a flat bottom heating surface, below which and along track direction, said carriage has a pair of horizontal, opposite, elongated clamps 24, 24' to receive and grip the respective longitudinal margins of the webbing 19. Each of these clamps may be a long hinge with its lower leaf fixed to the carriage frame and the upper leaf 24" swingable by operation of an air cylinder 27 mounted on the carriage, to open and close said clamps. Over the vacuum box 21, there are the rectangular frames 25, 26, which are normally apart to admit horizontally between them sheet material 19 gripped taut in the clamps 24, 24' which is transported between said frames as the carriage 18 assumes its position over the vacuum box. These frames 25, 26 together, constitute a clamping frame 28, which closes to hold the sheet material taut in horizontal position between the vacuum box 21 and the heater 23. The lower frame 26 which is below the plane of travel of the web 19, is fixed to the framework 16 below such plane. The upper frame 25 is above said plane and may be swingably mounted on the axis 25' onto horizontal bars 30 which extend between the ends of the framework, above the clamp 28, but sufficiently apart to allow up and down movement of the heater 23 as may be accomplished by the operation of the air cylinder 31 mounted on the carriage 18. The air cylinder 32 is for carriage movement, the air cylinder 33 is for up and down movement of the vacuum box 21, and the air cylinder 34 is for closing and opening the clamping frame 28. Said air cylinders 32, 33 and 34 are mounted on the framework 16.

The conveyor apparatus W shown herein, consists of two opposite endless identical chains 61, 61' riding in spaced vertical planes, each chain on suitably placed sprocket wheels as 62, 63 and 64 shown for one of them, so that the upper flights of said chains are horizontal. The vacuum box 21 is intermediate said chains, so trays 20 spanning said upper flights move under the clamping frame 28 and above the low position of the vacuum box; such movement being in a direction perpendicular to the direction of movement of the web, preferably. The sprocket wheels are of course in pairs and each pair is fast on a shaft of its own; such shafts journalled on the opposite conveyor frames 66, 66', being indicated by the numerals 67, 68 and 69 respectively. A clutch 70, of the type which runs free in one direction, but grips instantaneously in the other direction, is interposed in the shaft 67 away from and between the frames 66, 66', and same may be of the well known construction comprising the sections 71 and 72. Said clutch section 71 is a solid wheel, fits rotatably in a dished wheel 73 and is maintained therein by a retainer ring 74. Said parts 73 and 74 make up the clutch section 72 and in assembly, act as a collar on the clutch section 71. The shaft 67, is of course in two parts. The section 71 is fast on the shaft part 67'. The section 72 is fast on the shaft part 67", which latter also has the gear 74 secured thereon. This gear is in engagement with the rack 75 which is the piston rod of the air cylinder 76 mounted on the conveyor frame. The wheel 71 has spaced notches 77 across its periphery, parallel to its axis. The floor wall of each notch is flat. In each notch, there is a roller 78, positioned along the axis of the wheel 71; the shape of each notch being such that upon movement of the rack 75 into the cylinder 76, the rollers 78 just contact both clutch sections, so the shaft part 67' remains at rest though the shaft part 67" rotates, but when said rack moves outward of its cylinder 76, said rollers 78 become wedged tightly between the clutch sections 71, 72, making them engage and hence the whole shaft 67 will turn. Hence, the chains 61, 61' will be driven and the upper trays 20 will travel towards the work station of the vacuum molding apparatus V. It is thus evident that the clutch is open while the rack 75 is moving into the cylinder 76 and is closed when said rack is moving outward of said cylinder.

It is to be noted that the conveyor apparatus W is mostly forward of the vacuum molding apparatus V in order to have a number of trays 20 available to an operator for hand loading. The upper flights of the chains 61, 61' extend behind the vacuum box 21, to allow the last tray 20' worked on, to move away along the horizontal as 20", before it travels downward to be on the bottom flights of said conveyor chains. Each tray structure as 20, comprises a perimetrical frame 77 around a perforated bottom panel 78 and a perforated top panel 79, between which panels is a woven wire mesh 80. The upper panel has the upstanding pins 81 to locate a card 82 thereon which has the notches 83 to fit said pins. This card has identical cut-outs 84 in a predetermined spaced relation, to locate identical items 85 to be skin-packaged. Since these items in the embodiment shown, extend partially through the card as shown in FIG. 15, the upper panel 79 has the cut-outs 86 to receive such downwardly protruding parts of said items. In the bottom surface of each tray, there are sockets 87, 87', to receive locating pins 88, 88' respectively, which pins extend from opposite tray-supporting brackets 90, 90' mounted on said conveyor chains 61, 61' respectively. These brackets are equally spaced along said chains to properly determine the spacing of the trays 20, so that upon operating the cylinder 76 for the rack 75 to travel outward thereof, chain travel will bring the tray 20 to work position, directly over the vacuum box 21. Extending downwardly from the center region of the bottom of each tray, there is a hook 89 which is a Z-form whose distal ends are towards the conveyor chains respectively.

The vacuum box 21 has a central channel 91 across the top thereof, extending in the direction of travel of the upper flights of the conveyor chains 61, 61', thus forming two connected box sections 21', 21", whose top walls 21a and 21b are perforated. As mentioned, the vacuum box has a port 35 for connection to a vacuum supply not shown. Vacuum action is controlled by a valve 36. It is evident that when suction action is applied at 35, air will be drawn through the card 82 which has porous quality and through the tray structure 20, so a heated thermoplastic web held in the clamp 28 and confined to contact the margins of the tray on the vacuum box under it, will be drawn downward onto the laden card 82 on such tray, envelop the items 85 thereon, form a "skin" 86 around each item and adhere to the unoccupied portions of the ard as in FIG. 15. It is important to note that within the channel 91 of the vacuum box there must be something to engage the hook 89 on the tray which is at work station, when the vacuum box is lowered. So being that in the embodiment shown, said hook is a Z-form, there is a 7-form 92 extending centrally upwardly from the channel 91 of the vacuum box 21 and wholly within said channel. The normal rest position of said vacum box is below the tray path of trays approaching work station. The hook 89 on the tray coming into work station, passes freely into the channel 91 and is free to pass through it; the freely extending horizontal leaf 89' of the hook 89 being below the freely extending horizontal leaf of the hook 92. Of course, when a tray is at rest at work station, and the vacuum box 21 is raised by the operation of the air cylinder 33, the said tray will rise with said box. When said box is lowered, the hook 92 engages the leaf 89', thereby resetting the tray onto its brackets 90, 90' on the clains 61, 61' respectively; the tray having left the chains when it was raised by the vacuum box 21.

The card-cutting apparatus Z is a press whose ram 93, driven by an air cylinder 94, carries a cutting die 95, to cut the laden, skin-packaged card after it leaves the vacuum molding apparatus V, into equal sections, each section holding a packaged item 85.

In the control system shown in FIG. 14, which is one way that may be used, each of the air cylinders 27, 31–34, 76 and 94 is double acting and is controlled by a valve of similar type as shown at 41 which normally connects one end of the cylinder 32 it is associated with, to atmosphere, and the other to compressed air supplied to the distributor pipe 39. Upon actuation of the valve's related solenoid 40, the cylinder end which was connected to atmosphere will now receive compressed air and the cylinder end which initially was supplied compressed air, will now be connected to atmosphere. The valve 36 for controlling the suction action to the port 35 of the vacuum box 21, is normally closed, but is arranged to open upon actuation of the solenoid 37 to make the hollow structure of said box communicative with the vacuum supply from a suitable vacuum pump apparatus not shown. The solenoid 41 is for operating the valve associated with the cylinder 32. The solenoid 42 is for operating the valve associated with the cylinders 27. The solenoid 43 is for operating the valve associated with the cylinder 31. The solenoid 44 is for operating the valve associated with the cylinder 33. The solenoid 96 is for operating the valve associated with the cylinder 74. The solenoid 97 is for operating the valve associated with the cylinder 94.

In this system illustrated to show one manner of control, there is a timing apparatus indicated generally by the numeral 45 which serves to operate all the components in proper timed relation, and such consists of a revolvably mounted shaft 46 driven by a motor M through a gear box 98 so that the shaft shall revolve at such speed that during one revolution of said shaft 46, machine operation is one complete cycle. Hence, one terminal of each of the solenoids, is connected to the terminal 50 of a suitable electrical power supply. The other power supply terminal 50' is connected to a stationary brush a which is in constant contact with the circular wheel A secured on said shaft. The other terminals of said solenoids, 37, 40, 44, 43, 42, 41, 96 and 97 are respectively connected to the fixed brushes b, c, d, e, f, g, h and i. Each brush is adapted to coact with a cam designated by its similar capital letter. All the cams B–I and the wheel A are electrically conductive and so is the shaft 46 which carries all of them and makes them all electrically connected. The cams are each designed so that through a predetermined part of a revolution in respect to each of them as need be, they are in contact with their related brushes and for the balance of the revolution of the shaft 46, they are out of contact with their related brushes, and the cams are so arranged on the shaft around the 360 degrees of the shaft, that the several valves shall be operated in proper timed relation in accordance with the sequence of occurrences as set forth in the cycle of operation. It is evident that during such interval that a cam remains in contact with its related brush, that the circuit of its associated solenoid remains closed. When there is no such contact, that particular circuit is open.

At a commencement of a cycle of operation, the condition of the machine 15 is as shown in FIGS. 1–3, with the addition that the thermoplastic web 19 passes from off the supply roll 19', to be guided between the rollers at 60, and extends along and within the clamps 24, 24' and spanned between such clamps below the heater 23. It is to be noted that in the condition shown, the carriage 18 is away to one side of the molding station, the heater 23 is in its raised position, said clamps 24, 24' are in open condition, the clamping frame 28 is also in open condition and the vacuum box 21 is in its lowered position, the card-cutting die 95 is in raised position, a tray 20', loaded with articles 85 to be packaged, is on the belts 61, 61', and is positioned directly intermediate the vacuum box 21 and the clamping frame 28, and all the solenoid circuits are open. The heater 23 is always "on," so is the current in the mains 50, 50', compressed air is supplied to the distribution pipe 39, and vacuum is applied to the valve 36, also, motor M is running. During every revolution of the shaft 46, the following events will occur and their sequence will be as follows per revolution of said shaft.

The cam F coming in contact with the brush f, act as a switch to close the circuit of solenoid 42 which in turn will operate the cylinders 27, and the clamps 24, 24' will close tight, thereby gripping the longitudinal edges of the sheet material 19. The raised heater 23, during this time, warmed the sheet length which is between said clamps 24, 24'. Next, the cam G coming in contact with the brush g, actuates the solenoid 41 which in turn will operate the cylinder 32 and the carriage 18 will move so that the heater 23 and the sheet portion clamped by 24, 24' below it, are both directly above the vacuum box 20; said sheet portion being between the frames 26 and 26. During the movement of the carriage, the raised heater continued to warm, that is, preheat the sheet material below it, and due to such carriage movement, the preheated sheet length was transported to lie in the clamping frame 28. Of course, a length of web 19 unwound off the roll 19', is now where the carriage was originally. Next, brush c contacts cam C, closing the circuit of solenoid 40, which in turn operates the associated valve and the cylinder 34 will be operated to cause the clamping frame 28 to close. Simultaneously, the cam F ceases in contact with the brush f, thus deactuating the solenoid 42 and hence the cylinders 27 will thereupon be operated whereby the clamps 24, 24' open. Also simultaneously with the closing of the clamping frame 28 and the release of hold of the clamps 24, 24', or even a bit sooner if desired, the cam E coming in contact with the brush e, will actuate the solenoid 43 which in turn will cause the operation of the cylinder 31 to lower the heater 23. After a prescribed interval during which the preheated sheet length is now subject to a high heat to soften the sheet to a condition proper for molding, the cam B coming in contact with the brush b, actuates the solenoid 37 which causes the application of vacuum at 35 and at the same time, the cam D coming into contact with the brush d, actuates the solenoid 44 which causes the cylinder 33 to be operated whereby the vacuum box 21 will be lifted, which in turn will lift the laden tray 20' off the conveyor belts 61, 61' and elevate it through the frame 28. The pieces 85 to be packaged, meet the underside of the heated sheet material. The laden tray in coming through the frame 28, causes a seal to be formed permitting the sucking action of the applied vacuum to draw the sheet against the surfaces of said pieces 85 and the areas of the card 82 between such pieces, and to adhere thereto after being drawn in, and skin-package each of said pieces as shown in FIG. 15. At a prescribed time during the molding operation, the cam E ceases its contact with the brush e, thereby deactuating the solenoid 43 whereby the cylinder 31 will be operated to lift the heater 23, and also the cam G ceases its contact with the brush g thereby deactuating the solenoid 41 whereby the cylinder 32 will be operated to return the carriage 18 along the tracks 17 to its initial position as shown in FIG. 1.

After a definite interval, the cam D ceases its contact with the brush d, thus deactuating the solenoid 44, whereupon the cylinder 33 is operated to lower the vacuum box 21. Also, the cam B ceases its contact with the brush d, thus deactuating the solenoid 27, thereby causing the vacuum action at 35 to be shut off. The cam C ceases its contact with the brush c, thus deactuating the solenoid 40, whereupon the cylinder 34 is operated to open the clamping frame 28. By the descent of the vacuum box 21, the laden skin-packaged card remains in the general plane of the clamp 28, while the hook 92 on the vacuum box engages and pushes down on the hook 89, bringing the tray 20' down again onto the conveyor chains 61, 61', where the pins 88 will have entered the holes 87, 87' respectively, thus properly relocating the tray 29' on the conveyor belts. The cam H comes into contact with the brush h, thus closing the circuit of solenoid 96, to operate the cylinder 76 so its piston rod including the rack 75, shall move outwardly of such cylinder. This causes the gear 74 to turn, and the clutch 70 being in closed condition by such gear rotation, causes movement of the shaft 67, so the conveyor belts move a proper distance, to bring the tray 20' into the position shown held by the tray 20", and hence another laden tray carrying articles on a card to be packaged as described, is presented over the vacuum box 21, whereupon cam H ceases its contact with the brush h, thereby causing operation of said cylinder 76, to return the rack 75 to its initial position. Though the gear 74 did turn during such return movement of the rack, the clutch 70 remained open, and so that shaft 67 stood still. During the next and every subsequent cycle, the finished card will be shifted into the cutting press at Z, when the clamp 24, 24' are closed and the carriage 18 is moved to molding station. So upon the closing of the frame 28, while the vacuum box 21 is being elevated, the cam I comes into contact with the brush i, to close the circuit of the solenoid 97, thereby causing operation of the cylinder 94 to close the press, whereupon the cutting die 95 will cut the card 82 into sections, each having one skin-packaged item 85 thereon, ready for market. Of course, these smaller laden cards are quickly removed by means not shown, to clear the press in time for receiving the next finished card from the machine proper, and accessibility therefor is had because cam I and brush i go out of contact, to cause operation of the cylinder 94 to return the ram 93 and the cutting die 95 to raised position. This completes one cycle of operation of the machine 15, which is now again shown in the condition of FIG. 1, and the shaft 46 has made one complete revolution. It is evident that that this machine can continue automatically.

It is preferred to provide adjustment of the scope of movement of especially the pistons of the cylinder 32 which moves the carriage 18, that of the cylinder 31 which moves the heater 23 and that of the cylinder 33 which moves the vacuum box 21. To limit carriage movement, there is the adjustable collar stop 53 along the rod 54 which is fixed to the framework 16. For the cylinders 31 and 33, their piston rods extend through both ends of their respective cylinders and are provided with adjustable stop collars as 55 and 56. It is to be noted that the carriage 18 serves not only to transport the heater, but is the automatic feed means accomplished with the cooperation of the operated clamping means 24, 24', carried on said carriage, and there is automatic registering of the sheet portion worked on with the heating means and in relation to the vacuum box 21.

This invention contemplates the use of any means to bring a thermoplastic sheet into the clamping frame 28, and to remove it therefrom after the tray of goods worked on, is completed. Although the preferred embodiment is shown in the form of a fully automatic machine 15, by use of cylinders, valves and control means to operate them in proper timed relation, other actuable and controllable means may be employed in place of the specific expedients herein specifically illustrated and described, and if desired, the incidents of this invention without the automatic operation features in whole or in part, may be used where manual manipulation is employed by an operator in proper succession and timed relation.

This invention as to each of its features of construction and functional relationship of parts may assume numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific showing and description herein, to indicate the scope of this invention.

I claim:

1. In combination in an apparatus for skin-packaging at least one article positioned on an air-pervious card by applying vacuum action to draw a heated thermoplastic sheet atop said laden card, a frame, a vacuum box having a perforated top wall and an inlet for connection to a vacuum supply, mounted on said frame, sheet holding means on said frame, for receiving and releasably spanning a heated thermoplastic sheet, opposite and directly above said vacuum box, two endless conveyor belts positioned in spaced vertical planes on wheel means on the frame and arranged for simultaneous identical movement on said wheel means; said vacuum box being intermediate said belts and free for vertical movement therebetween, perforated trays spanning said belts, each adapted to hold a card thereon having at least one article thereon which is to be skin-packaged; said trays being equi-spaced along the entire length of said belts; one of said trays being directly intermediate and spaced from said vacuum box and sheet holding means; said belts and each tray having cooperative means locating and releasably holding the tray; each tray being liftable off said belts when on the upper flights of said belts; said vacuum box having a horizontal channel thereacross in a direction parallel to the planes of said belts; entrance down into said channel being from the top surface of the vacuum box, an element extending downwardly from the tray into said channel, means on the vacuum box within said channel adapted to engage said element upon downward movement of said vacuum box, whereby the tray is lowered; said element being free for movement into, along and out of said channel upon movement of said conveyor belts, means to raise the vacuum box whereupon the tray is lifted off the belts and raised upwardly a predetermined distance past the sheet-occupying plane in said sheet holding means and to then lower the vacuum box to its initial position whereby during such descent of the vacuum box, it will restore the tray it raised off the belts, back onto said belts, and means to move said conveyor belts a distance equal to the equi-spacing of the tray locating means on said belts.

2. The skin-packaging apparatus as defined in claim 1, wherein the sheet holding means comprises a pair of normally spaced frames one above the other, and said apparatus including means to feed successive lengths of thermoplastic sheeting, one at a time between said frames; said frames being relatively movable towards each other to clamp a sheet brought between them, a first means to operate the sheet-feeding means, a second means for operating said frames to open and close, a third means for raising and lowering the vacuum box, valve means for controlling the application of the vacuum action, and a means for operating said first, second and third means and also said valve means in a predetermined timed relation.

3. The skin-packaging apparatus as defined in claim 2, including a card-cutting means adapted to receive a packaged laden card and means for feeding such card into said cutting means upon the opening of said clamping frames, a fourth means to actuate said card-feeding means and a fifth means to actuate said cutting means; the means for operating the first, second, third and valve means in a predetermined timed relation, also controlling the operation of the fourth and fifth means in a predetermined timed relation.

4. The skin-packaging apparatus as defined in claim 3, wherein the means to feed the lengths of thermoplastic heated sheeting includes a carriage having clamping means to hold sheeting being transported by said carriage; the vacuum box being intermediate the normal rest position of said carriage and the card cutting means; the last mentioned clamping means extending beyond the vacuum box; said apparatus including a sixth means to open and close such clamping means; the means controlling the operation of said first, second, third, fourth, fifth and valve means in a predetermined timed relation, also controlling the operation of said sixth means in a predetermined timed relation; said last mentioned clamping means being adapted to deliver a packaged card into said cutting means at the same time said clamping means brings the next heated sheet length between the clamping frames over the vacuum box.

5. The skin-packaging apparatus as defined in claim 4, wherein the direction of movement of the thermopastic sheeting is perpendicular to the planes of said endless conveyor belts.

No references cited.

TRAVIS S. McGEHEE, *Primary Examiner.*